United States Patent [19]

Rowe

[11] 4,269,680

[45] May 26, 1981

[54] CURABLE POLYMERIC COMPOSITION COMPRISING NATURAL OR SYNTHETIC RUBBERS

[75] Inventor: William Rowe, Westfield, N.J.

[73] Assignee: Polychrome Corporation, Yonkers, N.Y.

[21] Appl. No.: 122,347

[22] Filed: Feb. 19, 1980

Related U.S. Application Data

[63] Continuation-in-part of Ser. No. 2,647, Jan. 11, 1979, Pat. No. 4,214,965, which is a continuation of Ser. No. 600,653, Jul. 21, 1975, abandoned, which is a continuation of Ser. No. 328,678, Feb. 1, 1973, abandoned.

[51] Int. Cl.$^3$ .................................................. C08F 8/00
[52] U.S. Cl. .............................. 204/159.17; 204/159.19
[58] Field of Search ...................... 204/159.15, 159.19, 204/159.17

[56] References Cited

U.S. PATENT DOCUMENTS

| | | | |
|---|---|---|---|
| 3,632,557 | 1/1972 | Brode et al. | |
| 3,752,786 | 8/1973 | Rossitto et al. | 260/33.4 UR |
| 3,782,961 | 1/1974 | Takahashi et al. | 204/159.15 |
| 3,864,133 | 2/1975 | Hisamatsu et al. | 204/159.15 |
| 3,891,523 | 6/1975 | Hisamatsu et al. | 204/159.15 |

*Primary Examiner*—Lewis T. Jacobs

[57] ABSTRACT

Photopolymerizable compositions comprised of (I) novel polymers which are substantially comprised of the reaction products of (A) organic polyisocyanates and (B) organic compounds containing at least about two active hydrogen atoms per molecule, said polymers having been end-capped by reaction with (C) organic compounds containing exactly one active hydrogen atoms and said end-capped polymers having viscosities of from about 5 to about 70 stokes when measured as a 30% solution in a mixture of approximately equal parts of xylol, methyl ethyl ketone and ethylene glycol monomethyl ether, at 25° C., (II) addition polymerization initiators activatable by actinic light, (III) addition polymerizable ethylenically unsaturated components capable of forming polymers by photoinitiated polymerization in the presence of the initiators, and (IV) a natural or synthetic rubber. The unsaturated components may be integral parts of the polymer's structure, or they may be separate compounds admixed with the polymers and initiators. Relief images, especially useful for printing, are prepared by exposure of a mass of the composition to a light source through, e.g., a transparency which has relatively opaque and relatively translucent areas, and subsequent development of the image by application of a developer composition.

9 Claims, No Drawings

CURABLE POLYMERIC COMPOSITION COMPRISING NATURAL OR SYNTHETIC RUBBERS

CROSS REFERENCE TO RELATED APPLICATIONS

This application is a continuation-in-part of U.S. Pat. Application Ser. No. 002,647, filed Jan. 11, 1979, now U.S. Pat. No. 4,214,965, issued July 29, 1980, which was a continuation of U.S. Application Ser. No. 600,653, filed July 21, 1975, now abandoned, which is a continuation of U.S. Pat. Application Ser. No. 328,678, filed Feb. 1, 1973, now abandoned.

This invention is concerned with novel polymers, particularly polyurethanes, polyureas and polyurethane-polyureas and processes for their preparation. It is also concerned with the use of such polymers in certain formulations to obtain compositions which are sensitive to actinic light, thereby becoming crosslinked so that any areas of the material which have been exposed to actinic light become preferentially insoluble in solvents in comparison to areas which have not been exposed to actinic light. This characteristic of the material may be utilized to prepare relief images. These relief images are suitable for direct use in printing.

There are at present on the market several presensitized plates for relief images which may be exposed to actinic light and thereby initiate photopolymerization to harden the polymer in the exposed areas of the plate. When the exposed plate is then developed, or washed with a solvent system for the unexposed areas, those areas are preferentially dissolved or washed away, thereby leaving the light-exposed areas in relief. However, these current commercial plates have several disadvantages.

One plate marketed by du Pont under the trademark "Dycril" is oxygen-sensitive and must therefore be stored in an inert atmosphere, e.g., $CO_2$. If it is not stored in an inert atmosphere, the plate must be preconditioned for a substantial period of time in an inert atmosphere. The user of the plate has between 30 to 45 minutes within which a conditioned plate must be exposed. If a plate is not exposed within that time, it must be reconditioned. The conditioning of the plates in an inert atmosphere is required to remove oxygen absorbed on the surface of the material, which would otherwise interfere with photopolymerization. On aging, the unprotected surfaces of the plates exude a powder, which must be washed off before the plate can be used. If the user intends to retain exposed plates for use in the future, they must be stored under special conditions. If not, the plates are either not useful or of limited effectiveness. As can be imagined, there is added and undesirable cost involved in the need for the inert atmosphere, e.g., $CO_2$, and the conditioning and storage equipment.

The "Dycril" plates are believed to be made by a hot melt application of the light-sensitive composition to the support. Heating of the composition, whether during preparation of the plate or during exposure to a light source which emits heat in addition to light, will result in thermally induced polymerization. Thermal stabilizers are therefore required in the composition to prevent its deterioration. The composition is believed to be a mixture of triethylene glycol diacrylate (monomer), cellulose acetate hydrogen succinate (polymer), 2-ethylanthraquinone (photoinitiator) and p-methoxyphenol (polymerization inhibitor [stabilizer]). The photopolymerized composition is extremely hard and inflexible and only lends itself to use as a letter press plate. On aging at room temperature, the exposed plate becomes brittle and loses adhesion to the substrate.

Another plate is marketed by BASF under the trademark "Nyloprint" and is composed of a nylon composition on a metal support plate. The nylon composition is believed to be applied to the support as a hot melt. The disadvantages of the hot-melt is that the high glass transition temperature requires high melt temperatures for coating, and to inhibit thermally induced polymerization in the composition it is necessary to incorporate a thermal stabilizer in it. A plastic film overlay on top of the nylon composition is required to protect the surface from atmospheric oxygen, which would otherwise impair its light sensitivity and to prevent surface exudation and surface crystallization of the crosslinking monomer, initiator or both. The film must be removed before the plate is used. However, once the protective plastic film overlay is removed, the plate has a limited storage life, e.g., overnight, during which it must be used, but after which it is useless due to exudation. Also, a plate should not be cut to smaller size until just before it is to be used because the area of the plate near the cut edge, after standing, will not yield a high quality image.

W. R. Grace markets a raised image platemaking system under the tradename "Letterflex", which seems to be described in U.S. Pat. No. 3,615,450. The system is unique in that it is not a presensitized plate ready for use, but rather employs a solid polymeric composition having a shelf life of six months. The composition is fluidized (in which state it has a pot life of several weeks) at elevated temperatures in a machine supplied by Grace, and applied to a polyester film or aluminum plate by the user, the printer. The user must coat the polyester film with hot composition and cut the coated film to size. Exposure of the plate utilizes actinic light, but must be by projection of the negative through an air gap, rather than by intimate contact. Otherwise the negative would adhere to the tacky, viscous polymeric composition. The exposed plate is then post-exposed through the back of the polyester film to improve the physical bond of the polymer to the polyester film. A coated aluminum plate cannot be exposed through its back, of course. The plate is then etched with solution, rinsed and dried. The dried plate is given a post exposure from above to reduce residual tack on the printing surface and to harden the plate to some degree. As can be imagined, time consuming and tedious operations are involved. Exposure by projection does not yield a relief image having "shoulders," i.e., a pyramidal base, which are necessary for strength of the printing surface, especially in the case of half-tone dots. In addition the use of mercapto compounds in the composition requires the use of odor-masking agents.

There has now been discovered a class of polyurethanes, polyureas and polyurethane-polyureas which do not suffer the disadvantages of commercial products when they are used to prepare relief image printing plates. This class of polymers will be illustrated in more detail hereinafter.

The isocyanate groups of polyisocyanates react with active hydrogen atoms of compounds containing such atoms. The active hydrogen atoms referred to are those which display activity according to the Zerewitinoff test as described by Kohler, J. Am. Chem. Soc., 49, 3181 (1927). Illustrative of the useful compounds containing active hydrogen atoms are those in which the active hydrogen atoms are attached to oxygen, nitrogen, or sulfur, i.e., the groups containing the active hydrogen are hydroxyl, mercapto, imino, amino, carboxyl, carbamoyl, substituted thiocarbamoyl, and the like. The compound can otherwise be aliphatic, aromatic, or cycloaliphatic, or of mixed types. Illustrative of specific compounds containing active hydrogen atoms are polyols and polyamines.

It is known that a polyurethane may be prepared by reacting a polyisocyanate, e.g., a diisocyanate, and a polyol, e.g., a diol. A polyurea may be prepared by reacting a polyisocyanate, e.g., a diisocyanate, and a polyamine, e.g., a diamine. A hybrid polymer, e.g., a polyurethane-polyurea, may be prepared be reacting a polyisocyanate, usually a diisocyanate, and a mixture of a polyamine and a polyol, or by first reacting the polyisocyanate with a stoichiometric deficiency of either the (a) polyamine or (b) polyol to form either a polyurea or polyurethane prepolymer respectively which is terminated with isocyanate groups and then reacting the prepolymer with whichever of (a) and (b) was not used to form the prepolymer in order to form the polyurethane-polyurea.

Illustrative of the polyisocyanates are the diisocyanates, e.g., the aromatic, aliphatic, and cycloaliphatic diisocyanates, and combinations thereof. More specifically illustrative of the diisocyanates are 2,4-tolylene diisocyanate, m-phenylene diisocyanate, xylylene diisocyanate, 4-chloro-1,3-phenylene diisocyanate, 4,4'-biphenylene diisocyanate, 1,4-tetramethylene and 1,6-hexamethylene diisocyanate, 1,4-cyclohexylene diisocyanate, 1,5-tetrahydronaphthalene diisocyanate, methylene dicylohexylene diisocyanate and the like. Diisocyanates in which each of the two isocyanate groups is directly attached to a ring are preferred, since, generally, they react more rapidly with the polyols. Especially preferred types are

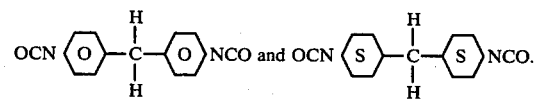

Other polyisocyanates, those having more than two isocyanate groups, may also be used. They may be prepared in different ways. For example, water may be used as an active hydrogen containing compound in the preparation of the polyisocyanate. Biuret polyisocyanates are thereby produced in accordance with the disclosure of U.S. Pat. No. 3,124,605, which describes a compound having not more than six —NCO groups and the formula:

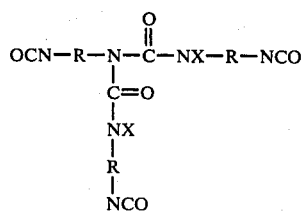

wherein X is selected from the group consisting of hydrogen and the grouping —CO—NX—R—NCO and R is the organic radical left after removal of the two —NCO groups from an organic diisocyanate selected from the group consisting of cyclohexane diisocyanate, hexamethylene diisocyanate, phenylene diisocyanate, lower alkyl substituted phenylene diisocyanate, lower alkoxy phenylene diisocyanate, diphenylmethane diisocyanate, dicyclohexyl diisocyanate and chloro-substituted phenylene diisocyanate, said hydrogen being the only one on the compound which is reactive with an —NCO group. The polyisocyanates can contain other substituents, although those which are free from reactive groups other than the isocyanate groups are preferred. Mixtures of polyisocyanates may also be used to prepare the unsaturated monomers used in this invention.

Illustrative of the polyols are the diols, triols, tetrols, etc. The diols are generally preferred.

More specifically illustrative of the monomeric diols are ethylene glycol; propylene glycol; 1,3-butylene glycol; 1,4-butane diol; 1,5-pentanediol, hexamethylene 1,3-bis (hydroxy ethyl)-5,5'-dimethyl hydantoin, glycol, etc. More specifically illustrative of the monomeric triols are 2-(hydroxymethyl)-2-methyl-1,3-propanediol, trimethylolpropane, glycerol, castor oil, etc. More specifically illustrative of the tetraols is pentaerythriol. The polyols may also be of the polyester or polyether type, the former being preferred.

Particularly preferred polyester polyols are those derived from the reaction of lactones, e.g., β-caprolactones, with diols, triols and polyols of low molecular weight (up to about 200), e.g., ethylene glycol, propylene glycol, butylene glycol, and the like; diethylene glycol, dipropylene glycol, and the like; glycerine, trimethylol ethane, trimethylol propane, and the like; pentaerithrytol, and the like. Many of these preferred polyester polyols are commercially available, e.g., a diol with a molecular weight of 530, a diol with a molecular weight of 830, a diol of a molecular weight of 1250, a diol of a molecular weight of 2000, a triol of a molecular weight of 540 and a triol of a molecular weight 900. Preferred molecular weight ranges from about 400 to 2,000; and most preferably is at least 800.

As indicated above, hydroxyl terminated lactone polyesters are especially useful. The hydroxyl terminated lactone polyesters may be formed by the reaction of an admixture containing a lactone and an organic bifunctional initiator; the lactone being in molar excess with relation to said initiator. The lactone has from six to eight carbon atoms in the lactone ring and at least one hydrogen substituent on the carbon atom which is attached to the oxy group in said ring. The organic bifunctional initiator has at least two reactive hydrogen substituents from hydroxyl, primary amino, secondary amino group, and mixtures thereof, each of the reactive hydrogen substituents being capable of opening the lactone ring, whereby said lactone is added to said initiator as a substantially linear group thereto. The hydroxyl terminated lactone polyesters possess, on the average, at least two of the linear groups, each of the linear groups having a terminal oxy group at one end, a carbonyl group at the other end, and an intermediate chain of from five to seven carbon atoms which has at least one hydrogen substituent on the carbon atom in said intermediate chain that is attached to the terminal oxy group. The hydroxyl terminated lactone polyesters have an average molecular weight of from about 300 to 7,000 and a hydroxyl number of from 374 to 16. A more complete description is contained in U.S. Pat. No. 3,186,971.

Of the hydroxyl terminated lactone polyesters, the polyester polyols derived from β-caprolactone are particularly preferred as mentioned above. The lactone polyester polyols generally have a uniform structure, a reproducible, narrow molecular weight distribution and reproducible physical properties. The hydroxyl groups are primary only and the exact hydroxyl functionality is known. The lactone-derived polyols are low in acidity, color and viscosity and have good oxidative and hydrolytic stability. In contrast, non-lactone derived polyester polyols (e.g., those prepared by polyesterification of polyols and dicarboxylic acids) contain ether linkages which are formed during polyesterification through hydroxyl+hydroxyl reaction and which are susceptible to oxidative degradation. The non-lactone-derived polyester polyols have a hydroxyl functionality which is variable and the exact functionality is not known. Their acid numbers, colors and viscosities are higher than those of the lactone-derived polyols. The polyether glycols have both primary and secondary hydroxyl groups, and the ether linkages, as mentioned above, are sites for oxidative degradation.

Additional polyester polyols which may be used to form the intermediates are those classes which are described on pages 44 to 48 of *Polyurethanes-Chemistry and Technology, Part I. Chemistry* by Saunders and Frisch (Interscience, 1962).

Illustrative of the polyethers which may be used to form the intermediates are those described on pages 32 to 44 of that volume. Because of their hydrophilic character, those polyethers which contain a preponderance of ethyleneoxy units are not preferred for use in preparing printing plates, if that preponderance results in an unacceptably low ink receptivity by the image areas of the coating on the plate. In a proper formulation, however, the ethyleneoxy content may not have an adverse effect on ink receptivity, but the hydrophilicity will contribute to ease of removal of non-image areas from an exposed lithographic plate by means of a substantially aqueous developer.

The polyol may also be an epoxy resin having pendant hydroxyl groups.

Illustrative of the aforementioned polyamines are, e.g., m-phenylenediamine, propylenediamine, ethylene diamine, 2,4-tolylenediamine, and the like.

A novel procedure which may be used to prepare the novel polymers of this invention comprises reacting an organic polyisocyanate and a compound containing at least 2 active hydrogens. The polyisocyanate is used in such an amount that there is an excess of equivalents of isocyanate groups over the equivalents of active hydrogen. It is preferred that the excess be such that the average percent free NCO in the resulting precursor polymer be from about 0.2 to 5 percent, more preferably from 3 to 4 percent, and most preferably from 3.2 to about 3.5 percent. The Gardner-Holdt viscosity, as defined hereinafter, is preferably about X to Y for the reacted mixture. However, a precursor polymer may be prepared which has a free NCO content of about 0.17 to about 1 percent, preferably a content of about 0.2 to about 0.6 weight percent, most preferably about 0.2 to about 0.3 weight percent. The water-free polyisocyanate may be reacted under an inert gas atmosphere, e.g., nitrogen, with the water-free active hydrogen containing compound at temperatures of from about room temperature to about 120° C. Elevated temperatures are preferred, most preferably from about 90° C. to about 110° C. Stirring or agitation should be maintained and the reaction temperature, e.g., 110° C. may be maintained by the rate of addition and/or heating and/or cooling depending on the exotherm developed. The presence of a solvent for the reactants and the resultant polymer is desirable because of the viscosity of the polymer. Xylene is a useful solvent. The water-free solvent and reactants may be charged initially to a clean dry reaction vessel, or the solvent and the active-hydrogen containing compound, e.g., polyol, may be charged and, if desired, heated while being admixed, and then the polyisocyanate added. The reaction temperature is held until the theoretical free remaining isocyanate weight percent is obtained as determined by titration of an aliquot from the reaction vessel with dibutylamine.

The polymers of this invention contain end-capping groups which are derived from mono-active hydrogen containing compounds reacted with a precursor polymer containing from about 0.2 to about 1 weight percent, preferably containing from about 0.2 to about 0.6 weight percent of free NCO groups so as to essentially fully end-cap the precursor polymer. If the precursor polymer, e.g., a polyurethane or polyurea, is a homopolymer made in a single step and containing free NCO in that range, then the end-capping step described below is next conducted. If a precursor prepolymer is formed which does not and the % NCO is higher, e.g., about 3%, then chain extension is conducted in accordance with the following step.

Chain extension may be conducted by reacting the precursor prepolymer with a compound containing at least two active hydrogen atoms, e.g., a diamine such as ethylene diamine (which may be added in a solvent system, e.g., 1:1 methyl Cellosolve:methyl ethyl ketone), in such an amount that the free NCO content is reduced to about 0.2 to about 1 weight %, preferably to about 0.2 to about 0.6 weight %, most preferably about 0.2 to about 0.3 weight %. The active-hydrogen containing compound is preferably slowly added to the previously reacted mixture. The compound containing active hydrogen atoms may be the same as or different from the one used to react with the polyisocyanate; preferably, it is different. If a diamine is used to extend the prepolymer, a temperature of from about 20° C. to about 30° C. may be used.

When the foregoing reactions are theoretically complete, the temperature is maintained and there is added with agitation one equivalent of a mono-active hydrogen containing compound, which may or may not contain olefinic unsaturation, e.g., hydroxyethyl acrylate or methyl Cellosolve, for each equivalent of the remaining isocyanate groups on the intermediate. If the compound contains unsaturation, then a vinyl polymerization inhibitor, e.g., hydroquinone, is also added in an effective amount. Preferably a catalyst for the reaction is added to increase the speed of the reaction. Illustrative of the catalysts which may be used are metallic catalysts, e.g., organo-metallics such as organotin compounds, e.g., stannous octoate, dibutyl tin dilaurate etc., organo cobalt compounds, e.g., cobalt naphthenate, lead compounds, e.g., lead octoate, zinc compounds, e.g., zinc octoate. Other known catalysts such as mineral acids, e.g., hydrochloric acid, nitric acid or the like or phosphines can be used. If used, an effective amount should be present in the reaction. The agitation is continued for a period of time sufficient to assure complete reaction, i.e., essentially no remaining free isocyanate groups and preferably a Gardner-Holdt viscosity of X to Z2, preferably Y to Z1. The reaction temperature may range from about 20° C. to about 60° C. The reaction mixture is cooled if necessary and yields the novel polymers of this invention, which may or may not contain olefinic unsaturation depending on the reactants.

The procedure for the preparation of the polymers of this invention described above may be conducted with only the reactants, inhibitors, if required, and catalyst present; but preferably is conducted in the presence of suitable solvents which may be subsequently removed, e.g., by vacuum stripping; or in a reaction medium of vinyl compounds, especially unsaturated esters, preferably higher boiling acrylates, e.g., ethyl hexyl acrylates, ethylene glycol diacrylate, trimethylolpropane triacrylate, pentaerythritol tetraacrylate, etc.; or a plasticizer such as dioctyl phthalate, etc., as a solvent medium and plasticizer; or any combination thereof. A solvent is preferably used in the preparation of higher molecular weight polymers having a relatively high viscosity.

The above description generally illustrates but one procedure for the preparation of the polymers of this invention. Variations are possible and in some instances may be desirable.

Illustrative of the useful end-capping compounds containing a single active hydrogen atom are those in which the active hydrogen atoms are attached to oxygen, nitrogen, or sulfur, i.e., the groups containing the active hydrogen are hydroxyl, mercapto, imino, amino, carboxyl, carbamoyl, substituted carbamoyl, sulfo, sulfonamide, thiocarbamoyl, substituted thiocarbamoyl, and the like. The compounds can otherwise be aliphatic, aromatic, or cycloaliphatic, or of mixed types.

Illustrative of the active hydrogen-containing compounds used to prepare the novel polymers of this invention are those containing aliphatic hydroxyl, phenolic hydroxyl, thiol, carboxyl, amine or amide groups.

Illustrative of the hydroxyl containing compounds which may be used are the alkanols containing up to about 18 carbon atoms, e.g., methanol, ethanol, propanol, butanol, etc.; cycloalkanols, e.g., cyclohexanol, etc.; the alkenols, e.g., allyl alcohol, etc.; cinnamoyl alcohol, and the polyols.

Illustrative of the thiol compounds which may be used are the monothiols, e.g., 1-butanethiol, 1-dodecanethiol, tert-butanethiol, etc.; and monomeric polythiols.

Illustrative of compounds which contain carboxyl groups and which may be used are acetic acid, cinnamic acid, β-phenylpropionic, fatty acids having 6 or more carbon atoms, e.g., caproic acid, lauric acid, linoleic acid, etc.

Illustrative of the amines which may be used are the secondary amines, e.g., dibutylamine.

Illustrative of the olefinically unsaturated active hydrogen-containing compounds which may be used are those which contain at least one active hydrogen atom and at least one addition polymerizable olefincially unsaturated grouping, i.e.,

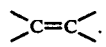

Those compounds containing one of each of these groups are preferred. Specifically illustrative of such monomeric unsaturated compounds are those containing active hydrogen atoms in groups mentioned above and an unsaturated grouping, preferably present as terminal unsaturation, i.e., the vinyl and acrylic compounds. It is preferred that the monomeric unsaturated compound contain from about 3 to about 12 carbon atoms. Exemplary unsaturated compounds are acrylic acid, cinnamic acid, methacrylic acid, hydroxyalkyl acrylates and methacrylates, e.g., hydroxyethyl acrylate and methacrylate, cinnamyl alcohol, allyl alcohol, diacetone acrylamide, unsaturated compounds containing secondary amino or amido groups, and the like.

Preparation of some of the novel polyurethanes, polyureas, and polyurethane-polyureas of this invention may be illustrated schematically by the following series of reactions:

I. DIISOCYANATE+DIOL→POLYURETHANE HIGH POLYMER (0.2–0.6% FREE NCO CONTENT)

POLYURETHANE HIGH POLYMER (0.2–0.4% FREE NCO CONTENT)-+MONOVALENT ACTIVE HYDROGEN COMPOUND→POLYURETHANE (0% FREE NCO CONTENT) END-CAPPED

II. DIISOCYANATE+BIVALENT ACTIVE HYDROGEN COMPOUND→POLYUREA (0.2–0.6% FREE NCO CONTENT)

POLYUREA (0.2–0.4% FREE NCO CONTENT)+MONOVALENT ACTIVE HYDROGEN COMPOUND→POLYUREA (0% FREE NCO CONTENT) END-CAPPED

III. DIISOCYANATE+DIOL→PREPOLYMER

PREPOLYMER+BIVALENT ACTIVE HYDROGEN (E.G., AMINE) COMPOUND-→POLYURETHANE POLYUREA HIGH POLYMER (0.2–0.6% FREE ISOCYANATE)

POLYURETHANE POLYUREA HIGH POLYMER+MONO-VALENT ACTIVE HYDROGEN COMPOUND→POLYURETHANE POLYUREA HIGH POLYMER (0% FREE NCO CONTENT) END-CAPPED

It will be noted that the high molecular weight extended polymers are not reduced to zero isocyanate content but are taken to a controlled free isocyanate value and then further reduced to zero free isocyanate with a compound containing one active hydrogen atom. By following the aforementioned procedure it is possible to prepare polymers of consistent molecular weight and narrow average molecular weight distribution as shown by kinematic viscosities studies. The ability to reproduce the high polymer is of utmost importance since the photopolymerizable printing plates, particularly relief plates, must have the same average response to actinic light producing essentially the same average cross-link density, respond to the developing solutions in essentially the same manner and not vary in extensibility, toughness, durometer and all the other properties necessary in the commercial use of relief plates.

The compounds which may be reacted with the isocyanate-terminated polyurethane prepolymers for chain extension to high molecular weight polymers are those with a plurality of active hydrogen atoms.

The chain-extending agents which may be used in the preparation of the high molecular weight polymers are compounds generally containing a plurality of active hydrogen atoms capable of reacting with isocyanate groups. Generally, no more than two atoms in the molecule of each chain-extending agent have active hydrogen attached thereto. Water and hydrogen sulfide can be used. Organic compounds containing two and only two atoms to which are attached active hydrogen atoms can likewise be used and are preferred in the present invention.

In the chain extender agents, the active hydrogen atoms are attached to oxygen, nitrogen, or sulfur, i.e., the groups containing the active hydrogen are hydroxyl, mercapto, imino, amino, carboxyl, carbamoyl, substituted carbamoyl, sulfo, sulfonamido, thiocarbamoyl, substituted thiocarbamoyl, and the like. The chain-extending compound can otherwise be aliphatic, aromatic, or cycloaliphatic, or of mixed types. Typical of many specific chain-extending compounds useful in this connection are glycols, e.g., ethylene, hexamethylene, diethylene glycols; dicarboxylic acids, e.g., adipic and terephthalic acids, carboxamides, e.g., adipamide; mercapto-containing compounds, e.g., 1,2-ethanedithiol; amino and mixed amino-containing compounds, e.g., monoethanolamine, 4-aminobenzoic acid, m-phenylenediamine, propylenediamine, aminopropionic acid; sulfonamide-containing compounds, e.g., 1,4-cyclohexane-disulfonamide, 1,3-propanedisulfonamide; diamines, e.g., ethylenediamine and 2,4-tolylenediamine. The preferred chain-extending compounds are those in which at least one of the active hydrogens is hydrogen on amino nitrogen. The more preferred chain-extending compounds are those which are organic as distinct from the inorganic chain-extending agents, since the former are generally more soluble in or compatible with the isocyanate-terminated prepolymer. Furthermore, when water, carboxylic acids, or sulfonic acids are used as chain-extending agents, gaseous products are evolved during the chain-extending reaction which must be removed unless a porous product is desired. For use in forming the photopolymerizable compositions of the present invention these are generally not desired. When the polyurethane prepolymer is extended to polyurethane polyureas, the most preferred compound is Ethylene diamine.

The prepolymer may be extended with diamino benzophenone

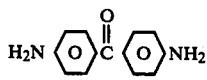

or mono amino benzophenone thereby uniquely incorporating the initiator within the polymer. If the final polymer also contains unsaturated end groups the polyurethane polyurea polymer would contain ethylenically unsaturated groups in the same polymer back-bone as the initiator benzophenone group.

For chain extension, the most preferred chain extending compounds are those in which the only active hydrogen is hydrogen on amino nitrogen, e.g., ethylene diamine. Although linear polymers are preferred, one may include amounts of trifunctional compounds, e.g., triamines or triols, in the polymer to vary extensibility, toughness etc. One may also include ring diols, e.g., 1,4-cyclohexane diol, bis phenol (i.e., aliphatic or aromatic ring diols) to vary the glass transition temperatures and the aforementioned properties and also to control in large part by design the hardness of the final composition.

The polymers of particular significance for use in the photopolymerizable compositions of this invention are those wherein substantially all the isocyanate groups have been reacted, i.e., where on a molar basis the sum total of the available active hydrogens from the mono and polyfunctional compounds containing them will substantially equal the number of available isocyanate groups in the polyisocyanate compound. Many of these products are substantially linear polymers and are somewhat elastic, homogeneous solids.

A preferred class of these polymers are those having a relatively narrow molecular weight distribution and a molecular weight from 5,000–10,000 to about 50,000, and especially those ranging in molecular weight from 10,000–20,000. The most desirable are those wherein the chain units achieved through the reaction of the chain-extending agent are greatly in the minority.

The novel polyurethane-polyureas of this invention may contain from 99 to 1 percent of urethane units, and from 1 to 99 percent of urea units, preferably from 99 to 95 percent of the former and from 1 to 5 percent of the latter.

The polymers of this invention which can be incorporated in inks and coating compositions for paper, wood, metal, etc. eminently meet the particular requirements of the respective utilities. Many are, or may be cross-linked to form, compounds or resins which are oleophilic in character thereby providing adequate properties as inks. They are, or are compatible with, film-formers that are soluble in common organic solvents, are usually substantially or completely insoluble in water, and are compatible both physically and chemically with fillers, pigments and dyes and other coloring agents. Moreover, the unsaturated monomers may be formulated into compositions which form good continuous films, have exceptional abrasion resistance, are sufficiently tough and hard for long wear, and have a requisite degree of resiliency and flexibility without undue brittleness. Chemical and physical stability, such as to the conditions of printing presses and to the chemicals used in connection therewith, also are important properties possessed by the polymers of this invention, especially by the photopolymerizable compositions of this invention which contain those polymers and have been photopolymerized. The photopolymerized compositions may have widely differing hardnesses depending on the initial formulations.

The photopolymerizable compositions of this invention are comprised of a novel polymer, derived from an organic polyisocyanate and a compound containing a plurality of active hydrogens, particularly a polyurethane, polyurea or polyurethane-polyurea, an addition polymerization initiator activatable by actinic light, an addition polymerizable ethylenically unsaturated component capable of forming a polymer by photoinitiated polymerization in the presence of the initiator and a natural or synthethic rubber. The unsaturated component may be an integral part of the polymer's structure, or it may be a separate compound admixed with the polymer and initiator, or both. Relief images, especially useful for printing, are prepared by exposure of a mass of the composition to a light source through, e.g., a transparency which has relatively opaque and relatively translucent areas, and subsequent development of the image by application of a developer composition. The transparency may be a mechanical negative, i.e., a stencil, or a positive or negative photographic transparency. The inclusion of fatty acid moieties, e.g., those containing from about 6 to about 18 carbon atoms, in the photopolymerizable compositions enhances the oleophilicity of those compositions for certain utilities, e.g., inks and lithographic plates.

It is possible to cure the instant compositions. For example, with suitable agents in compositions containing the unsaturated components, the components can be cross-linked or cured during exposure to actinic light and/or can be cured by heat instead of or before or after exposure to actinic light. Curing generally will enhance properties such as abrasion resistance, bonding to a substrate and cohesive character of the composition particularly in the form of a film or coating. Curing agents for this purpose are used in small amounts, i.e., in amounts less than about 5% by weight of the unsaturated monomer and generally less than about 1%, and include peroxides, for example dicumyl peroxide, and the like. The more stable peroxides are preferred.

The photoinitiator component, i.e., addition polymerization initiator activatable by actinic light, should be chosen carefully, both as to identity and concentration. It must be soluble in the overall composition or capable of substantially uniform distribution therethrough. Many such compounds are known, and they can be used singly or admixed in the present composition. The photoinitiators are generally present in the compositions in amounts ranging from about 0.01% to about 10.0% with preferred quantities lying in the range of 0.1–5.0% based on the total composition.

Thus, the free radical generating addition polymerization initiators useful in these new compositions are those capable of initiating polymerization under the influence of actinic light which are dispersible in the aforesaid unsaturated monomers of this invention to form photopolymerizable compositions, to the extent necessary for initiating the desired polymerization under the influence of the light energy available and which are preferably not active thermally at temperatures below 80°–85° C. Preferably no other type of initiator is present except for the normally unavoidable, adventitious trace quantities of peroxides. The preferred initiators are obviously those which are most rapidly affected by the light energy available in the shortest exposure times to initiate the greatest number of growing polymer chains. These photopolymerization initiators are used in amounts of from 0.01–10.0% and preferably from 0.1–5.0% based on the weight of the entire composition. Suitably such initiators include vicinal ketaldonyl compounds, e.g., diacetyl, benzil, etc.; α-ketaldonyl alcohols, e.g., benzoin, pivaloin, etc.; acyloin ethers, e.g., benzoin methyl or ethyl ethers, etc.; α-hydrocarbon-substituted aromatic acyloins, including α-methylbenzion,α-allylbenzoin [U.S. Pat. No. 2,722,512], and α-phenylbenzoin; the polynuclear quinones, such as anthraquinone, naphthoquinone, the aromatic ketones, e.g., 4,4'-bis [dimethyamino] benzophenone (Michler's ketone), etc.; the o-alkyl xanthate esters [U.S. Pat. No. 2,716,633]; and the like. The acyloin ethers and Michler's ketone are particularly useful.

Further illustrative known photosensitizer compounds are acetophenone, propiophenone, xanthone, benzophenone, fluorenone, triphenylamine, carbazole, 3-or 4-methylacetophenone, 3-or 4- pentylacetophenone, 3-or 4-methoxyacetophenone, 3-or 4bromoacetophenone, 3-or 4- allylacetophenone, p-diacetylbenzene, 3-or4- methoxybenzophenone, 3-or 4- methylbenzophenone 3-or4- chlorobenzophenone, 4,4'-dimethoxybenzophenone, 4-chloro- 4'- benzylbenzophenone, 3-chloroxanthone, 3,9-dichloroxanthone, 3-chloro, 8-nonylxanthone, 3-methoxyxanthone, 3-iodo-7-methoxyxanthone, n-butyl benzoin ether, and the like, metal compounds, dyes and the like.

Illustrative of free radical initiators which may be used are the dialkyl peroxides [cyclic or acyclic], diaryl peroxides, hydroperoxides, peracids, peresters, azo compounds, and other known free radical sources. Specifically illustrative thereof are di-tert-butyl peroxide, benzoylperoxide, 2,4-dichlorobenzoyl peroxide, t-butyl-hydroperoxide, 2,5-dimethyl-2,5-bis [hydroperoxy]hexane, peracetic acid, perbenzoic acid, t-butyl peroxypivalate, t-butyl peracetate, azo bisisobutyronitrile, and the like.

As is obvious, one can use one or more photosensitizers or free radical initiators or combinations of each type or of both types. It is to be understood that any known photosensitizer or free radical initiator can be used; one is not restricted to those specifically referred to above.

Most commercially available polymerizable monomers discussed previously for use in the photopolymerizable compositions normally contain minor amounts (about 50–100 parts per million by weight) of polymerization inhibitors so as to prevent spontaneous polymerization before desired. The presence of these inhibitors, which are usually of the anti-oxidant type, e.g., hydroquinone, tertiary butyl catechols and the like in such amounts causes substantially no undesirable results in the photopolymerizable compositions of this invention either as to speed or quality of polymerization. In fact, larger quantities of such inhibitors, e.g., of the order of 200–500 parts per million can easily be tolerated and may be advantageous in tending to reduce unwanted polymerization, e.g., during storage or in nonexposed, i.e., non-image areas of relief plates which have been exposed through a photographic transparency. Illustrative classes of stabilizers are the quinones, the phenols, benzophenone derivatives, Uvinols$^{TM}$, phenothiozines, naphthalamines and the like.

The photopolymerizable composition can be composed of any addition-polymerizable component (e.g., ethylenically unsaturated monomer) and any photopolymerization initiator or catalyst, both either singly or in admixture with one or more other similar components and initiators.

The photopolymerizable compositions may contain as the unsaturated components unsaturated monomers which are addition-copolymerizable.

Among the monomers that can be used in the photopolymerizable compositions of this invention are the ethylenically unsaturated monomers containing at least one polyermizable ethylenically unsaturated group of the structure:

There can be used a single monomer or a mixture of two or more monomers through out the entire concentration ranges possible, selected to suit a particular purpose. The monomers can be aliphatic, aromatic, cycloaliphatic, or any variant thereof. Illustrative thereof there can be mentioned the olefinic hydrocarbons containing up to about 18 carbon atoms, preferably the normally liquid ones, e.g., pentenes, hexenes, dodecene, heptenes, octenes, styrene, 4-methylstyrene, alphamethylstyrene, cyclo-pentadiene, 5-methyl 1-hexene, and the like; acrylic acid and its derivatives, such as acrylonitrile, methacrylonitrile, acrylamide, methacrylamide, methacrylic acid, methyl methacrylate, ethyl methacrylate, ethyl acrylate, 1-ethylhexyl acrylate, 2-ethylhexyl acrylate, hydroxyethyl acrylate, butoxyethoxyethyl acrylate, neopentyl glycol diacrylate, glycidyl acrylate, and the like; the vinyl halides such as vinyl chloride, vinylidene chloride, and the like; the vinyl esters such as vinyl acetate, vinyl propionate, vinyl butyrate, vinyl benzoate, and the like; the vinyl ketones such as isopropenyl methyl ketone, vinyl methyl ketone, alphachlorovinyl methyl ketone, and the like; the vinyl thioethers such as vinyl ethyl sulfide, vinyl p-tolysulfide, divinyl sulfide, and the like. Other monomers or monomer mixtures which are capable of polymerization by the process of this invention are divinyl sulfone, vinyl ethyl sulfone, vinyl ethyl sulfoxide, vinyl sulfonic acid, sodium vinyl sulfonate, vinyl sulfonamide, vinyl pyridine, N-vinyl pyrollidone, N-vinyl carbazole, and the like. Other suitable vinyl monomers are readily apparent to those skilled in the art. This listing is illustrative only and not all-inclusive. The preferred monomers include styrene and its derivatives and the acrylyl and methacrylyl compounds and derivatives thereof which are compatible with the compositions.

The photopolymerizable compositions may contain amounts of the unsaturated monomers ranging from 5 to 99% of the composition, preferably from about 10%–60%, and most preferably from about 20% to about 50% by weight.

The photopolymerizable compositions may also contain any of the known crosslinkers, including but not limited to the polyunsaturated crosslinkers such as triallyl cyanurate, allyl acrylate, allyl methacrylate, diallyl terephthalate, N,N'-methylene diacrylamide, 1,2-ethylene diacrylate, diallyl maleate, diallyl fumarate, 1,2-ethylene dimethacrylate, hexamethylene bis maleimide, triallylphosphate, trivinyl trimellitate, divinyl adipate, trimethylolethane triacrylate, trimethylolpropane triacrylate, glyceryl trimethacrylate, pentaerythritol tetraacrylate, diallyl succinate, divinylbenzene, and the like. The crosslinkers can be present at concentrations as high as about 90 percent, or more, but preferably less than 50 percent. The monomers and crosslinkers should be compatible in the compositions.

As the unsaturated components there may be used the olefinically unsaturated novel compounds described in the copending application of William Rowe, U.S. Ser. No. 315,212, filed Dec. 14, 1972. The saturated novel compounds described in that application are useful as plasticizers in the compositions of this invention. Briefly, the novel compounds are the products of monomeric organic reactants containing one or more active hydrogen atoms as determined by the Zerewitinoff method, e.g., a polyol, and organic polyisocyanates, e.g., diisocyanates, in such amounts as to provide about two isocyanate groups for each active hydrogen-containing group, thereby forming isocyanate terminated intermediates which are reacted with monomeric organic reactants having at least one active hydrogen-containing group and preferably also an unsaturated group, preferably in a terminal position. One of the monomeric organic active hydrogen-containing reactants must have only one active hydrogen.

In addition to the aforesaid components or mixtures thereof, the photopolymerizable compositions can also contain added preformed compatible condensation or addition polymers as well as immiscible polymeric or nonpolymeric, organic or inorganic fillers or reinforcing agents which are essentially transparent, e.g., organophilic silicas, bentonites, silica, fiber glass and powdered glass having a particle size less than 0.4 mil in their minimum dimension, and in amounts varying with the desired properties of the photopolymerizable layer, which can be liquid or solid in nature.

Suitable preformed compatible polymers include the addition polymers generally, such as the polyvinyl acetals, e.g., polyvinyl butyral, formal and hydrolyzed derivatives thereof; and the like. Suitable compatible condensation polymers include both saturated and unsaturated types, such as the alkyd polymers, e.g., polyglycerol phthalate, polyglycerol maleate, and the like. Suitable modified natural polymers include the cellulose esters and ethers, e.g., cellulose acetate butyrate and ethyl cellulose. Other useful polymeric fillers include: epoxy resins; polyureas; phenolics; polyacrylics; polyesters, polyurethanes; the polymeric glycols and glycol ethers, e.g., the polyethylene glycol ethers; the polyethylene oxides, especially the 1000–5000 molecular weight species. The foregoing polymers will generally be used in only relatively minor amounts.

These added substituents can be present in all the foregoing compositions in order to modify their rheological properties, render the photopolymerizable compositions even more tack-free where desired, and make the composition more readily formable into films and sheets. Since a stiff sheet can be more easily handled in many forming operations, e.g., in preparing a photopolymerizable plate for use in making a printing plate, the use of filler materials such as the foregoing giving the requisite stiffness has commercial advantages. Mixtures of two, three, or more of the foregoing compatible polymers and/or fillers can be used in the photopolymerizable compositions, but in general the filler should not be present in amounts exceeding about 40% by weight of the whole composition. With polymeric fillers amounts up to about 90%, preferably about 20% by weight of the whole give the best results. The amounts of those resins usually varies from about 10% to about 100% by weight based on the weight of the unsaturated component. The addition of resins to a coating composition tends to improve its properties, especially the press-life of a printing plate.

Inert, relatively non volatile, liquid or semi-liquid plasticizers can be present and are efficacious when the compositions per se are too stiff, or when relatively low amounts of a low molecular weight polymerizable unsaturated component, e.g., 10–15% by weight of the whole, are present. Suitable plasticizers are the lower molecular weight novel compounds described in the application of William Rowe, U.S. Ser. No. 315,212 filed Dec. 14, 1972, preferably the saturated compounds, but also the mono-unsaturated low viscosity compounds, which may function as reactive diluents or plasticizers.

In accordance with the teachings of this invention, it is possible to formulate photopolymerizable compositions which are essentially 100% non-volatile (extremely low vapor pressure) and which emit essentially no volatiles before, during and after curing by exposure to actinic radiation.

The rubber component of the instant invention includes one or more of natural rubbers and synthetic rubbers. Non-exclusive examples of such include acrylic rubbers, butadiene rubbers, butyl rubber, chloroprene (neoprene) rubber, epichlorhydrin rubber, halogenated rubbers, sulfonated rubbers, isoprene nitrile rubbers (ex: acrylonitrile-butadiene), polyisoprene rubbers, styrene butadiene rubbers, styrene isoprene (ex: styrene polyolefin), and ethylene-vinyl acetate rubber.

The amount of such rubber component in the composition of this invention may vary widely. A preferred ratio of the rubber component to the polymer component of this invention ranges from 90:10 to 10:90 parts by weight. A more preferred range is from 30:70 to 70:30 parts by weight.

An important feature of the present invention with its rubbery component is that a flexographic high relief printing plate may be thusly produced by applying the composition to a suitable substrate. Such plates have a soft, resilient surface which cushions the impact of a printing press impression. Such a flexographic plate is especially important for printing on thin films such as cellophane and polyethylene. The lack of sharp edges on such a plate permits printing of such materials without cutting or otherwise damaging the film. Such a plate allows high quality printing on the film without smears or sliding.

When used to make films or coatings, or in inks, e.g., printing inks, the compositions of this invention may be pigmented with many organic or inorganic pigments, e.g., molybdate organe, titanium white, phthalocyanine blue, chrome yellow, and carbon black, as well as colored by conventional dyes, e.g., methylene blue. Stock which may be printed includes paper, clay-coated paper, board and metal. In addition, the compositions of the present invention are suitable for the treatment of textiles, both natural and synthetic, e.g., in textile printing inks or for specialized treatments of fabrics to produce water repellency, oil and stain resistance, crease resistance, etc. The type and amount of pigment and dye used should be such that the curability of the photopolymerizable compositions is not adversely affected.

The photopolymerizable compositions of this invention are also useful as adhesives.

The 100 percent solids photopolymerizable coating compositions may be produced by mixing the selected components thereof by conventional known methods. The blend can be heated, if desired, to facilitate mixing, or the components may be present during synthesis, i.e., solvent, monomers, etc.

Although reference has been made herein to 100 percent solids coating compositions, it is to be understood that the coating compositions can also contain solvents and can be used to coat articles. The coating is then cross-linked after evaporation of the volatile solvent.

A solvent may be used to blend the unsaturated monomer and any other components in the photopolymerizable compositions, and to coat them as an integral composition onto an appropriate substrate. A suitable solvent desirable should dissolve both the unsaturated component and the other components at least to an extent that a commercially practical coating solution is formed, a solution in which the unsaturated component and other components are compatibly retained in the proportions desired for the coating subsequently to be formed on the substrate from the solution.

Practical organic solvents, used alone or in combination with others, and which are thus presently preferred according to this invention, include methylene chloride, dimethyl formamide, dimethyl sulfoxide, butyl Carbitol, methyl Cellosolve, methyl Cellosolve acetate, ketones such as acetone, methyl ethyl ketone and cyclohexanone, ethers such as trioxane and dioxane, and heterocyclics such as tetrahydrofuran, pyridine and isophorone. Methyl Cellosolve and methyl ethyl ketone are particularly suitable solvents to use.

The amount of solvent may be varied to suit any desired utility. Amounts from about 10 to about 90% may be useful.

The coating compositions may be applied by conventional means, including spray, melt, curtain, dip, pad and roll-coating techniques and by use of an intensive mixer and extruder, and may, if desired, be dried under ambient or oven conditions to provide coating films on a substrate with or without an intermediate bonding component. The substrate can be any composition, e.g., wood, metal, paper, plastic, fabric, fiber, ceramic, concrete, plaster, glass, etc. When the coating material is adhered to a rubber or fabric substrate known as an "offset blanket" one may effectively convert an offset printing press to a flexographic printing press by a simple substitution of printing press cylinders.

Coating thickness depends mainly on the concentration of the coating composition and the mechanical means by which it is applied to base sheets. For example, in a continuous process wherein a roll of sheet aluminum is passed through a coating tank, there must be taken into account for each particular system the speed of the web, the tank length, subsequent drying time and temperature, and solvent volatility, if any is used. The concentration of the coating composition can vary. Presently from about 10 to about 90 parts of photopolymerizable composition per 100 parts of coating composition can be used, good results being obtainable at concentrations of about 10 to about 50 parts thereof.

The photopolymerizable compositions of this invention when irradiated under a suitable actinic light source are converted to a cross-linked insoluble matrix. This insolubility may be useful for a variety of purposes. For example, if certain areas of a coating are cured and certain are not, as, for example, when the coating is exposed through a negative transparency, the coating may then be treated with a solvent or developer whereby the exposed areas are not dissolved and removed, but the unexposed areas are. Depending on the configuration and any substrate, such as metals and plastics, fabric, paper, etc. there can be formed, for example, storage-stable presensitized lithographic plates, printed circuit boards, presensitized silk screens, presensitized paper printing mats, UV-curable monofilaments and multifilament yarns, "rubber" stamps, stencils, flexographic printing plates, letterset printing plates, gravure printing plates, etc. The desired hardness of flexibility of the final cured form of the compositions can be achieved by formulation of the composition within the teachings of this invention.

An important aspect of this invention comprises photopolymerizable elements comprising an unsupported film or a support and thereon a layer, preferably solid, of the photopolymerizable compositions of this invention. The latter compositions can be readily converted into unsupported film or supported layer form in preparing the photopolymerizable elements, preferably from solution, utilizing conventional mechanical means and methods, e.g., coating, casting, extruding, calendering, or the like, with or without added plasticizers, fillers, etc. The photopolymerizable compositions in film or layer form are surprising in the excellent solid state properties they exhibit, even when containing relatively large proportions of the polymerizable component. Thus, these compositions, even when containing 50–60% by weight of the polymerizable component, still retain their desirable solid properties and most importantly show no appreciable increase in softness or tackiness. After exposure through a process transparency, these new compositions are readily developable to printing reliefs with suitable solvents.

The printing reliefs obtained from these compositions are outstanding because of the excellent wear resistance which they exhibit. Quite surprisingly, these printing reliefs, although prepared from a rubbery or elastomeric product, can be made rigid in the relief heights and print with excellent fidelity and substantially perfect register. The wear characteristics of the resulting plates are excellent and they form economical substitutes for the previously known premium quality plates, e.g., the difficult to prepare and expensive nickel-faced electrotypes. The printing plates are important commercially because of the extremely long press runs which can be carried out with them.

The photopolymerizable elements of the invention suitable for the preparation of relief images, especially useful for printing, comprise a film or a layer of the photopolymerizable composition from about 3 to about 250 mils in thickness and embody a suitable adherent support. In a preferred embodiment, these elements will comprise supports from which no more than 35% of the incident actinic light is reflected. When the support material is light reflective, e.g., metal plates or foils, which are outstanding because of inherent superior physical properties, there will preferably be superposed on said support and adherent thereto a layer absorptive of actinic light so as to permit reflectance from the combined support of no more than 35% of the incident actinic light. Thus, the support can contain an antihalation material or have a layer or stratum of such material on its surface. The photopolymerizable layer itself can serve as the light-absorptive layer when dyes or pigments or other materials significantly absorptive of the actinic light are included in the photopolymerizable composition. Similarly, the adherent support for the relief height-forming photopolymerizable stratum can be a supporting sheet of the photopolymerizable composition itself.

The printing reliefs may be such that an exposed and developed relief prints from the heights of the relief as in a letterpress or letterset plate, in which case the photopolymerizable element would be exposed to a negative transparency, or it may print from the low points of the relief as in a gravure plate, in which case the photopolymerizable element would be exposed to a positive transparency.

Another type to photopolymerizable element which is particularly useful comprises a transparent support which has on one surface a coating of the photopolymerizable composition of this invention (the first layer) and which has coated on the other surface a silver halide emulsion layer (the second layer), the relative sensitivity of the said two layers being such that an imagewise exposure sufficient to provide a developable image in the second layer is insufficient to cause the formation of any appreciable developable image in the first layer. In practice the silver halide emulsion side is exposed to an original, the resultant silver halide image formed on the second layer is developed, stabilized, fixed and/or the exposed silver halide is removed. The first layer is exposed to an all-over ultraviolet light through the silver image and the resultant positive image of the original is developed in the first layer by removing the unexposed photopolymerizable composition in the first layer. As the transparent support any material relatively transparent to ultraviolet light may be used, but polyethylene terephthalate film is preferred. If necessary the surface to which the first layer is attached may be treated to increase adhesion between the surface and first layer. The other surface is made receptive to a silver halide emulsion layer through the usual means used in preparing photographic film, i.e., "subbing".

Although the photopolymerizable compositions bond well to clean substances, especially metal substrates, an electrolytically, chemically or mechanically grained metal substrate may be used for a better bond of the composition to the substrate. Chemical coupling agents may be used, if desired, to increase the bond of the composition to a substrate. Illustrative of such coupling agents is γ-aminopropyl triethoxysilane. Adhesives may be used to aid in bonding the composition to a substrate.

Practically any initiator or catalyst for addition polymerizable which is capable of initiating polymerization under the influence of actinic light can be used in the photopolymerizable composition of this invention to be used in preparing photopolymerizable elements. Because opaque (black) areas of transparencies absorb heat and would transmit the heat to photopolymerizable elements in contact therewith, thereby polymerizing intended non-image areas, and conventional light sources emit heat as well as light, the preferred catalysts or initiators for addition polymerizable are not activatable thermally and preferably are soluble in the polymerizable component to the extent necessary for initiating the desired polymerization under the influence of the amount of light energy absorbed in the relatively short term exposures used in the process of this invention. Precautions can be taken to exclude heat rays so as to maintain the photopolymerizable layer at temperatures which are not effective in activating the initiator thermally, but they are troublesome. In addition, exclusion of heat rays makes necessary longer exposure times since the rate of chain propagation in the polymerization reaction is lower at reduced temperatures. For this reason the photoinitiators most useful for this process are those which are not active thermally at temperatures below 80°–85° C.

A presensitized printing plate or other articles made as described above may be exposed to light through an image transparency and the non-image area may be removed by developing the plate. The methods and means of exposing and developing the exposed plate are those well known and commonly used in the art. The developer may be any solvent for the photopolymerizable composition which does not adversely affect the polymerized area.

The light-promoted reactions induced by initiators in the photopolymerizable compositions causes a sufficient differential between exposed and unexposed areas of the composition so that the developing solution effects removal of the unexposed area without adversely affecting the exposed area.

Actinic light from any source and of any type can be used in the photopolymerization processes of this invention. The light can emanate from point sources or be in the form of parallel rays or divergent beams. Inasmuch as the free-radical generating, addition polymerization initiators activatable by actinic light generally exhibit their maximum sensitivity in the ultraviolet range, the light source should furnish an effective amount of this radiation. Such sources include carbon arcs, mercury-vapor lamps, fluorescent lamps with special ultra-violet light-emitting phosphors, argon glow lamps, and photographic flood lamps. Of these, the mercury-vapor lamps, particularly the sun lamp type, and the fluorescent an lamps, are most suitable.

Among the numerous improvements and advantages provided by this invention are, briefly, the provision of photosensitive compositions that (1) are generally more light-sensitive, i.e., faster, than many prior art photosensitive systems, (2) are not adversely affected by storage in air, (3) cure on a substrate to form a durable, abrasion resistant, solvent resistant finish, (4) may be developed on a substrate with relatively inexpensive desensitizing or developing solutions, (5) have substantially at least the shelf life, storability, light-sensitivity and durability of, e.g., currently commercial presensitized printing plates, and generally substantially longer presslife, (6) generally have excellent oleophilic properties, which is advantageous in attracting inks, (7) require no special storage after development, (8) can be satisfactorily developed to form high quality, sharp, fine objective areas or images quickly and easily by development with developers, (9) many of the cured formulations exhibit outstanding resistance to attack by chemicals, e.g., hydrofluoric acid, solvents, etc.

The novel process of the invention allows one to produce a polymer having a relatively low molecular weight and a narrow molecular weight distribution, which polymer may be chain terminated with a variety of end groups as may be desirable. The process also generally allows the preparation of the polymer in solution at a high concentration than has been possible with the preparation of polymers of the prior art.

EXAMPLE 1

A urethane prepolymer was prepared by reacting at approximately 100° C. one (1) equivalent (415 gms) of a caprolactone diol with a molecular weight of 830 (commercially available from Union Carbide Corporation under the tradename Niax polyol D 520 or PCP 0210) with two (2) equivalents (198 gms) of 4,4'-methylene bis cyclohexyl diisocyanate, (commercially available from du Pont as Hylene W or from Allied Chemical as Nacconate $H_{12}$), an NCO/OH equivalent ratio of 2/1. The reaction was conducted under essentially anhydrous conditions, in sufficient urethane grade Xylol that the resulting prepolymer comprised 67%, and for a period of time to attain a free NCO content of between 3.3–3.5 weight percent and a viscosity (Gardner-Holdt1933) of approximately Y - Z. To the urethane prepolymer mixture, cooled to 25° C., there was then added over a period of 2 hours a quantity of ethylene diamine, dissolved in ethylene glycol monomethyl ether (methyl Cellosolve ®) and methyl ethyl ketone (equal parts) as the solvent system. The amount of solvent was calculated to bring the total nonvolatile content to 31%, and the amount of diamine was calculated to bring the weight percent free NCO to 0.2–0.3. The reaction mass was held at 25°–30° C. until there was attained a constant free NCO of 0.2–0.3 weight percent. The viscosity was approximately X-$Z_1$ (Gardner-Holdt 1933). The extended polymer solution was then heated to 60° C., and there was added 0.05% (based on the weight of polymer) of dibutyl tin dilaurate, dissolved in ethylene glycol monomethyl ether and methyl ethyl ketone (equal parts), in an amount calculated to further reduce the percent nonvolatiles to 30%. The percent free NCO was reduced to 0% by terminating the polymer with the monohydroxyl compound, ethylene glycol monomethyl ether. The resultant solution of polyurethane polyurea polymer terminated with the monohydroxy compound was clear and water white, with a viscosity (Gardner-Holdt 1933) of approximately X-Z.

EXAMPLE 2

A photocurable mixture was prepared by charging into a suitable intensive mixing apparatus, or on a two roller rubber mill, 70 parts by weight of Uniroyal Paracial CLM, acrylonitrile butadiene synthetic rubber and 30 parts of the elastomer from Example 1 and intimately mixed. To the blended mixture are then added 43 parts of Uvimer (TM) 530, unsaturated urethane oligomer (Polychrome Corp.), and 4.3 parts of isopropyl Benzoin ether.

The compound is then formed into a film by extrusion through an appropriate extruder. The photocurable film is attached to a metal substrate by a suitable glue line, such that the glue line is not attacked by the plate developer. The reverse side of the photocurable film is protected against handling by laminating a thin film of polyester or other suitable film thereto.

To prepare a printing plate the protective film layer is removed, the plate contacted in a vacuum frame, with a negative and exposed to actinic light between 200 and 420 nanometers for a suitable length of time, approximately 3–15 minutes. After exposure, the plate is developed by a suitable solvent or combination of solvents such that the exposed areas are not attacked and removed but the non-exposed portions are removed. The plate that is obtained is then dried and optionally post exposed. The plate when mounted on a letter press or flexographic press gives excellent length or run, print quality and resistance to ink solvents.

The mixture may optionally be prepared in suitable solvents and then either cast coated or multiple coated upon a suitable substrate.

EXAMPLE 3

Example 2 was repeated except that natural rubber (Uniroyal SIR-56) was substituted for the Paracial Acrylonitrile Butadiene synthetic rubber. The remainder of the formulation was identical. Printing plates prepared and run on a press gave excellent length of run, print quality, and resistance to solvents.

I claim:

1. A composition which is comprised of an admixture of:
   I. a polymer which is substantially comprised of the reaction product of:
      A. an organic, active hydrogen containing compound, which compound has an average active hydrogen functionality in the range of from 2.0 to about 2.2 with,
      B. an excess of an organic polyisocyanate so as to form an isocyanate terminated prepolymer, said prepolymer having been subsequently reacted with, C. an organic, active hydrogen containing compound, which compound has exactly one active hydrogen; said polymer having a molecular weight of from 5,000 to 50,000 with 0% free isocyanate groups; and, II. an addition polymerization initiator activatable by actinic light; and, III. an addition polymerizable ethylenically unsaturated component capable of forming a polymer by photoinitiated polymerization in the presence of said initiator; and, IV. a natural or synthetic rubber in an amount ratio of rubber to polymer of 90:10 to 10:90 parts by weight.

2. The composition of claim 1 wherein said prepolymer has been extended by a second active hydrogen containing compound having an average active hydrogen functionality in the range of from 2.0 to 2.2 prior to being reacted with said component C.

3. An element which comprises a substrate, said substrate having coated on at least one surface thereof the composition of claims 1 or 2.

4. An ink which comprises the admixture of the composition of claims 1 or 2 with a compatible colorant.

5. The composition of claim 2 wherein said active hydrogen containing compound (A) is a polyol, said polyisocyanate is a diisocyanate and said second active hydrogen containing compound having an active hydrogen functionality in the range of from 2.0 to 2.2 in a diamine.

6. The composition of claim 5 wherein said polyol is a diol with molecular weight in the range of from 400 to 2,000.

7. The composition of claim 1 which further comprises one or more compositions selected from the group consisting of polymerization inhibitors, colorants, organic or inorganic fillers, compatible solvents, plasticizers, diluents, coupling agents, adhesives and catalysts.

8. The composition of claim 1 or 2 wherein said component IV comprises one or more compounds selected from the group consisting of acylic rubbers, butadiene rubbers, butyl rubbers, chloroprene rubbers, epichlorhydrin rubbers, halogenated rubbers, sulfonated rubbers, isoprene, polyisoprene rubbers, nitrile rubbers, styrene-butadiene rubbers, styrene-isoprene rubbers, and ethylene-vinyl acetate rubbers.

9. The element of claim 3 wherein said component IV comprises one or more compounds selected from the group consisting of acrylic rubbers, butadiene rubbers, butyl rubbers, chloroprene rubbers, epichlorhydrin rubbers, halogenated rubbers, sulfonated rubbers, isoprene, polyisoprene rubbers, nitrile rubbers, styrene-butadiene rubbers, styrene-isoprene rubbers, and ethylene-vinyl acetate rubbers.

* * * * *